(12) United States Patent
Silverstein et al.

(10) Patent No.: US 11,656,885 B1
(45) Date of Patent: May 23, 2023

(54) INTERFACE INTERACTION SYSTEM

(71) Applicant: International Business Machines Corporation, Armonk, NY (US)

(72) Inventors: Zachary A. Silverstein, Georgetown, TX (US); Jacob Thomas Covell, New York, NY (US); Alvin Zhang, Somerville, MA (US); Vittorio Partesano, Astoria, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/651,904

(22) Filed: Feb. 22, 2022

(51) Int. Cl.
  *G06F 3/0482* (2013.01)
  *G06F 9/451* (2018.01)
  *G06F 11/32* (2006.01)
  *G06F 11/34* (2006.01)

(52) U.S. Cl.
  CPC ............ *G06F 9/453* (2018.02); *G06F 3/0482* (2013.01); *G06F 11/327* (2013.01); *G06F 11/3438* (2013.01)

(58) Field of Classification Search
  CPC .... G06F 11/3438; G06F 3/0482; G06F 9/453; G06F 11/327
  See application file for complete search history.

(56) References Cited

U.S. PATENT DOCUMENTS

| | | | |
|---|---|---|---|
| 5,565,894 A | 10/1996 | Bates | |
| 8,352,884 B2* | 1/2013 | Zalewski | G06N 7/005 |
| | | | 715/811 |
| 8,656,280 B2* | 2/2014 | Morikawa | H04N 21/432 |
| | | | 715/708 |
| 8,869,022 B1* | 10/2014 | Mills | G06F 11/3438 |
| | | | 715/230 |
| 9,032,328 B1* | 5/2015 | Kilat | G06F 9/451 |
| | | | 715/744 |
| 9,207,804 B2* | 12/2015 | Cudak | G06F 11/22 |
| 10,346,029 B2* | 7/2019 | Chakra | G06F 3/0484 |
| 10,610,783 B2 | 4/2020 | Benedetto | |
| 11,159,673 B2* | 10/2021 | D'Alterio | H04M 1/724 |
| 2005/0193208 A1* | 9/2005 | Charrette | G07F 7/1033 |
| | | | 713/182 |

(Continued)

FOREIGN PATENT DOCUMENTS

JP   H06309102 A   11/1994

OTHER PUBLICATIONS

Johana Renny Octavia et al., "Squeeze Me and I'll Change: An Exploration of Frustration-triggered Adaptation for Multimodal Interaction," 2011, IEEE Symposium on 3D User Interfaces 2011, pp. 79-86. (Year: 2011).*

*Primary Examiner* — Dino Kujundzic
(74) *Attorney, Agent, or Firm* — Brian M. Restauro

(57) ABSTRACT

Embodiments of the present invention provide computer-implemented methods, computer program products and computer systems. Embodiments of the present invention can capture one or more interactions with an existing user interface displayed within a display screen. Embodiments of the present invention can then, in response to reaching a threshold level of interactions, dynamically generate an alternate user interface comprising one or more alternate interaction methods. Embodiments of the present invention can then overlay the alternate user interface over the existing user interface.

20 Claims, 6 Drawing Sheets

(56) References Cited

U.S. PATENT DOCUMENTS

| | | | |
|---|---|---|---|
| 2007/0035524 A1* | 2/2007 | Hyatt | G06F 1/1626 |
| | | | 345/173 |
| 2008/0231604 A1* | 9/2008 | Peterson | G06F 3/04886 |
| | | | 345/173 |
| 2009/0265644 A1* | 10/2009 | Tweed | G06F 3/04886 |
| | | | 715/762 |
| 2010/0082516 A1 | 4/2010 | Basu | |
| 2013/0100037 A1* | 4/2013 | Mabie | G06F 3/04186 |
| | | | 345/173 |
| 2014/0253494 A1* | 9/2014 | Jiang | G06F 3/0488 |
| | | | 345/174 |
| 2014/0320437 A1* | 10/2014 | Kang | G09G 5/373 |
| | | | 345/173 |
| 2020/0104148 A1* | 4/2020 | R | G06F 9/453 |
| 2020/0310842 A1* | 10/2020 | Yen | G06F 9/453 |
| 2021/0019044 A1* | 1/2021 | Herrmann | G06F 3/0418 |

\* cited by examiner

INTERFACE INTERACTION SYSTEM

BACKGROUND

The present invention relates generally to the field of mobile interfaces, and more particularly to customizing interactions within mobile interfaces.

A user interface (UI) is the space where interactions between humans and machines occur. The goal of this interaction is to allow effective operation and control of the machine from the human end, while the machine simultaneously feeds back information that aids the operators' decision-making process. Examples of this broad concept of user interfaces include the interactive aspects of computer operating systems, hand tools, heavy machinery operator controls, and process controls.

Generally, the goal of user interface design is to produce a user interface which makes it user friendly to operate a machine. User interfaces are composed of one or more layers. For example, user interfaces can have a human-machine interface (HMI) that interfaces machines with physical input hardware (e.g., keyboards, mice, or game pads, and output hardware such as computer monitors, speakers, and printers). A device that implements an HMI is called a human interface device (HID). Additional UI layers may interact with one or more human senses, including: tactile UI (i.e., touch), visual UI (i.e., sight), auditory UI (i.e., sound), olfactory UI (i.e., smell), etc.).

SUMMARY

According to an aspect of the present invention, there is provided a computer-implemented method. The computer implemented method comprises: capturing one or more interactions with an existing user interface displayed within a display screen; in response to reaching a threshold level of interactions, dynamically generating an alternate user interface comprising one or more alternate interaction methods; and overlaying the alternate user interface over the existing user interface.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize certain deficiencies with mobile user interfaces. For example, when interacting with mobile devices and touch screens, there is an issue with initiating the right, that is, correct or otherwise desired command (i.e., function, action, etc.). Single tap, Double tap, tap and hold, multi finger hold, multi finger tap, etc. are all examples of such actions that may be used on a respective area on a device screen to input or otherwise initiate a specific action. On the other hand, using physical hardware such as mouse to move and select with a cursor in a traditional manner may not be practical and could still present similar issues with executing the desired command.

Embodiments of the present invention provide solutions for interaction errors that improve user interface functionality. For example, embodiments of the present invention provide alternate interaction functionality that enhance user interface functionality. Specifically, embodiments of the present invention can capture repeated failed interactions in a specific area (i.e., zone) of a touch screen interface, generate alternate input and interaction methods, and provide and subsequently display the alternate interaction on the existing user interface. In this manner, embodiments of the present invention can improve user interface and technology thereof by dynamically providing (e.g., generating and deployment of) alternate input mechanisms beyond default interaction mechanisms as discussed in greater detail later in this Specification.

Figure 1:
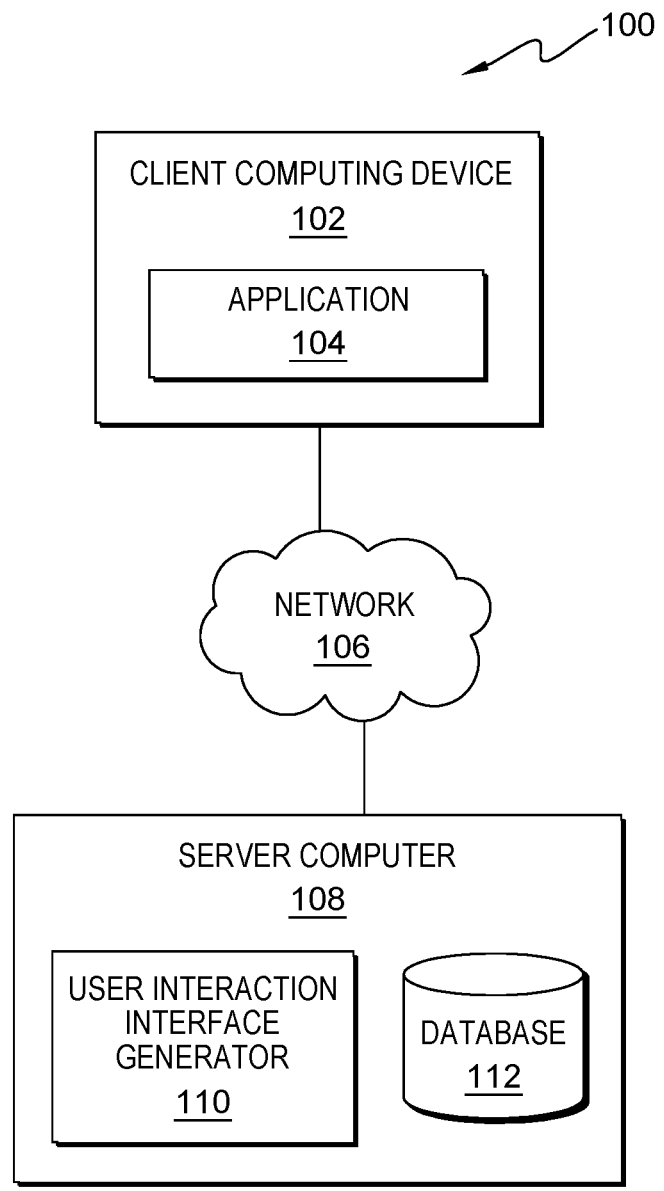
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access user interaction interface generator 110 (e.g., using TCP/IP) to access content, user information, and database information. Application 104 can further communicate with user interaction interface generator 110 dynamically provision alternate user interfaces comprising one or more alternate input mechanisms, as discussed in greater detail in FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts user interaction interface generator 110 and database 112. In this embodiment, user interaction interface generator 110 resides on server computer 108. In other embodiments, user interaction interface generator 110 can have an instance of the program (not shown) stored locally on client computer device 102. In other embodiments, user interaction interface generator 110 can be a standalone program or system that can be integrated in one or more computing devices having a display screen.

User interaction interface generator 110 can dynamically provision alternate user interfaces comprising one or more alternate input mechanisms on an end user device. In general, user interaction interface generator 110 can, with user informed consent monitor one or more user interactions. As used herein, a user interaction can be a tactile input from a respective user (e.g., as a single tap, double tap, tap and hold, multi finger hold, multi finger tap, drag and drop, pinch to zoom, etc.). Each user interaction can correspond to one or more functional commands. For example, functionalities provided (i.e., functional input commands) can include switching between applications, enlarging a screen window, enlarging and/or adjusting a photo. In some instances, a user interaction can also include one or more audio and visual inputs. For example, user interaction interface generator 110 can access a microphone or camera of the device to detect signs of frustrations.

For each received interaction, user interaction interface generator 110 stores each received interaction and maps a corresponding location of the screen, and respective commands associated with the user interface being displayed. In this embodiment, the location of the screen refers to a confined area within the display field of the user device capable of receiving at least tactile input (e.g., from a user). This may refer to a confined area determined by pixel location or quadrant at a hardware level or application element at the software level. In this way, user interaction interface generator 110 can track multiple user interaction attempts and functions associated with those attempts. In some embodiments, user interaction interface generator 110 can generate a separate graphic that can be subsequently displayed on a user interface depicting a heat map of respective user interaction attempts.

User interaction interface generator 110 can receive information from a display screen having one or more tactile and pressure sensors. Information received can be one or more tactile inputs such as a single tap, double tap, tap and hold, multi finger hold, multi finger tap, drag and drop, etc. In some embodiments, user interaction interface generator 110 may also have access to one or more tables that map a received input to a respective command. For example, user interaction interface generator 110 can access a table that specifies that a single tap corresponds to an input command of "select".

In other embodiments, user interaction interface generator 110 can receive an indication of frustration level from the user (e.g., from repeated failed input). For example, in this embodiment, user interaction interface generator 110 can access microphone information from the device the user is interacting with. In this example, user interaction interface generator 110 can detect audible grunts, sighs, and speech and interpret those sounds as expressions of frustration using a combination of natural language processing and topic analysis. In some embodiments, user interaction interface generator 110 can utilize biometric indicators to determine frustration levels of users (e.g., sweat, grip strength, etc.).

In this embodiment, user interaction interface generator 110 identifies a user as being frustrated if it detects at least one of the following: more than one failed user interaction, audible or visual cues associated with frustration, or biometric indicators indicating frustration. In other words, user interaction interface generator 110 detects frustration if any one of the above-mentioned indicators are identified.

In other embodiments, user interaction interface generator 110 can analyze and compare a current user interaction to a user behavior profile to determine frustration level using a combination of machine learning and natural language processing techniques. In response to detecting abnormal behavior, that is, behavior that deviates from a baseline behavior typically exhibited by the user (according to the user behavior profile) user interaction interface generator 110 identifies the abnormal behavior as frustration. For example, user interaction interface generator 110 can reference a user behavior profile to identify that the user typically maximizes the user interface (e.g., fit to width of the screen) when using a certain application. However, user interaction interface generator 110 has detected multiple failed interactions (e.g., multiple input selections followed by cancel commands) and identify this as abnormal behavior and thus classify this set of interactions as frustration. Conversely, user interaction interface generator 110 can record user behaviors such as repeated failed interactions and identify that as normal behavior (e.g., multiple input selections, followed by cancel commands in an attempt to maximize the windows). In this circumstance, user interaction interface generator 110 automatically generate and display the alternate user interface that makes selecting the "maximize window" command easier to select.

In embodiments where a user behavior profile is not present, user interaction interface generator 110 can continue to monitor user interactions and build a user behavior profile. Some examples of user interactions that can be recorded by user interaction interface generator 110 can include user preferences (e.g., the user prefers to have a larger screen when working with presentation applications, user preference to have application windows side by side during certain hours of the day, etc.).

In another example, user interaction interface generator 110 can measure frustration levels based on a configured number of failed attempts. In this embodiment, a failed attempt is defined as a repeated interaction followed by a subsequent action cancellation. In this embodiment, user interaction interface generator 110 can be configured to register a failed attempt threshold after three of the same interaction followed by subsequent action cancellation. In other embodiments, user interaction interface generator 110 can be configured to any optimal failed attempt threshold.

In response to detecting a failure, user interaction interface generator 110 can analyze the location of associated with the detected failure and identify functional commands associated with the location. For example, user interaction interface generator 110 can identify the location associated with the failure and identify that the location provides selection functions (e.g., click level, left click, right click, hotkey) and application selection functions (e.g., drop down menu, selection, execute functionality). In another embodiment, user interaction interface generator 110 can utilize a weighting system when there are multiple elements nearby by examining HTML, Pixel Distance, etc. between user interface event handlers on touchscreens. In this way, user interaction interface generator 110 can catch whether a user's tactile inputs do not match with the user's intention (e.g., pressing the wrong button instead of hitting a red X on a browser window it keeps minimizing). In this embodiment, user interaction interface generator 110 can then leverage the assigned weight values of the weighting system to order the one or more elements based on a level of confidence (e.g., most probable of being the input command to least).

User interaction interface generator 110 can then generate and subsequently provision and display an alternate user interface that present selectable user functions associated with the repeated failed attempts. For example, user interaction interface generator 110 can generate a drop down menu that is overlaid over the existing user interface comprising a list of associated functions at a font size of 1.75 times of the font size of the interaction area that was associated with the failed attempts. In other embodiments, user interact interface generator 110 can make the generated alternate user interface fit to the width size of the display screen such that it replaces the existing user interface until user interaction interface generator 110 receives an input. In instances where there is only one functional command, user interface generator 110 automatically initiates the input command.

In this embodiment, user interaction interface generator 110 initiates a feedback loop to capture user inputs, user sentiments, and refine its user interface generation. For example, any re-attempts to perform the same action will act as a negative feedback loop to the system. Conversely, a successful action attempt will act as positive feedback loop to the system.

Database 112 stores received information and can be representative of one or more databases that give permissioned access to user interaction interface generator 110 or publicly available databases. For example, database 112 can store received source material, depicted graphics, user interactions, user interfaces, functionalities associated with user interfaces, interaction components, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
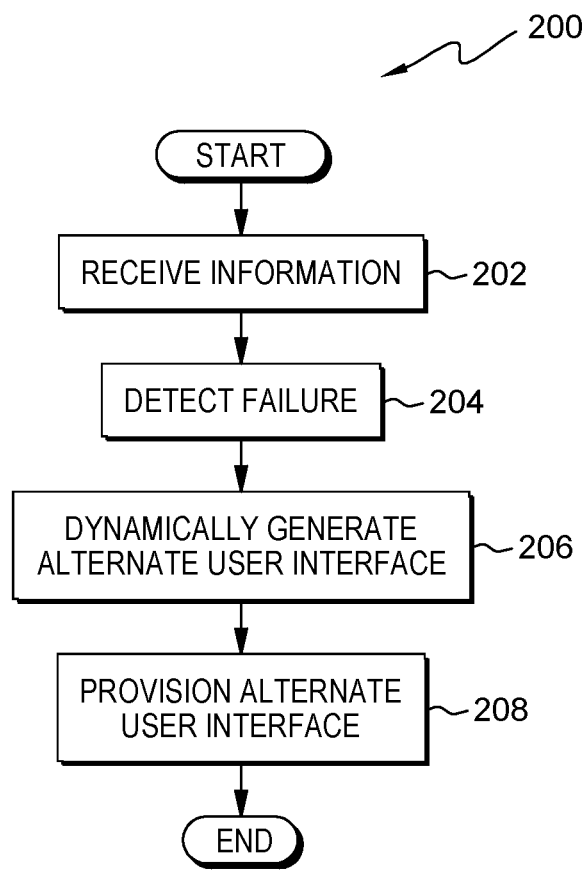
FIG. 2 is a flowchart depicting operational steps for dynamically generating an alternate user interface, in accordance with an embodiment of the present invention in accordance with an embodiment of the present invention.

FIG. 2 is a flowchart 200 depicting operational steps for dynamically generating an alternate user interface, in accordance with an embodiment of the present invention.

In step 202, user interaction interface generator 110 receives information. In this embodiment, user interaction interface generator 110 receives information from a display screen having one or more tactile and pressure sensors (e.g., client computing device 102). In other embodiments, where user interaction interface generator 110 is stored locally on client computing device 102, user interaction interface generator 110 can receive information via network 106. In other embodiments, user interaction interface generator 110 can receive information from one or more other components of computing environment 100.

As mentioned above information received generally refers to one or more tactile inputs that correspond to one more input command. For example, tactile information can include a single tap, double tap, tap and hold, multi finger hold, multi finger tap, drag and drop, etc. In some embodiments, user interaction interface generator 110 may also have access to one or more tables that map a received input to a respective command. For example, user interaction interface generator 110 can access a table that specifies that a single tap corresponds to an input command of "select".

In this embodiment, user interaction interface generator 110 can store a map of received tactile inputs. In this embodiment, user interaction interface generator 110 can map corresponding locations of tactile inputs to one or more respective areas (i.e., locations) on the display screen and map the tactile input to a respective input command. In this way, user interaction interface generator 110 can generate and subsequently display a heat map of areas of the display screen receiving multiple tactile attempts (e.g., one or more clusters of interactions). In other embodiments, user interaction interface generator 110 can access a mapped function list associated with a user interface of respective tactile inputs and respective commands those tactile inputs map to.

In other embodiments, information can also include an indication of frustration level from the user (e.g., from repeated failed input). Information can be received via manual input from a user or automatically. For example, user interaction interface generator 110 can detected repeated failed attempts (e.g., a sequence comprising of an input command followed by a cancel command, repeated multiple times). User interaction interface generator 110 can also access microphone information from the device the user is interacting with. In this example, user interaction interface generator 110 can detect audible grunts, sighs, and speech and interpret those sounds as expressions of frustration using a combination of natural language processing and topic analysis. In some embodiments, user interaction interface generator 110 can utilize biometric indicators to determine frustration levels of users (e.g., sweat, grip strength, etc.).

In step 204, user interaction interface generator 110 detects failures. In this embodiment, user interaction interface generator 110 detects failures after a threshold number of repeated commands are cancelled are reached or exceeded. For example, user interaction interface generator 110 can detect a failure once a repeated sequence of "input command" via tactile sensor followed by a "cancel command" of that previous input command. In this embodiment, the threshold number of cancelled input commands is three. In other words, user interaction interface generator 110 detects a failure once the threshold number of repeated cancel commands is reached or exceeded.

In another embodiment, user interface generator 110 can detect a failure as an expression of frustration. In other words, user interface generator 110 can also detect the presence or absence of user frustration. In this embodiment, user interface generator 110 can detect presence or absence of user frustration if it detects at least one of the following: more than one failed user interaction, audible or visual cues associated with frustration, or biometric indicators indicating frustration. In other words, user interaction interface generator 110 detects frustration if any one of the above-mentioned indicators are identified.

In step 206, user interaction interface generator 110 dynamically generates an alternate user interface. In this embodiment, user interaction interface generator 110 dynamically generates an alternate user interface by accessing a previously generated heat map of received tactile inputs associated with the failed attempts. User interaction interface generator 110 can then access a mapping of input commands associated with the area having multiple failed attempts. User interaction interface generator 110 can then generate a new user interface depicting the input commands that are associated with the area having failed attempts. In other words, user interaction interface generator 110 determines alternate input and interaction methods for the display area having multiple failed attempts and in response to reaching a threshold level of either failed interactions or frustration, generate an alternate user interface.

For example, user interaction interface generator 110 can generate a drop-down menu that is overlaid over the existing user interface comprising a list of associated functions at a font size of 1.75 times of the font size of the interaction area that was associated with the failed attempts. In other embodiments, user interact interface generator 110 can make the generated alternate user interface fit to the width size of the display screen such that it replaces the existing user interface until user interaction interface generator 110 receives an input. In instances where there is only one functional command, user interface generator 110 automatically initiates the input command.

In step 208, user interaction interface generator 110 provisions the alternate user interface. In this embodiment, user interaction interface generator 110 provisions the alternate user interface on the display screen according to user preferences. For example, user interaction interface generator 110 can generate and subsequently display a user interface that resembles a pop-up window alerting a user of the screen of multiple failed attempts and a request to confirm the generation and subsequent display of a new user interface that displays input commands in an easier to select interface. In this embodiment, an easier to select interface refers to an alternate user interface having dimensional changes such as larger font size, increased paragraph spacing, etc. In other embodiments, the alternate user interface can include audible cues (e.g., verbal instructions to a user for inputting commands). In some examples, the alternate user interface may comprise a drop-down menu having selectable options fit to the width of a screen. In examples where there are multiple input commands that cannot be displayed with the desired font size (e.g., where only two of the four options can be displayed on a single page, user interaction interface generator 110 can provision a second page that the user can toggle between with a selectable graphic icon resembling a left and right arrow.

Figure 3A:
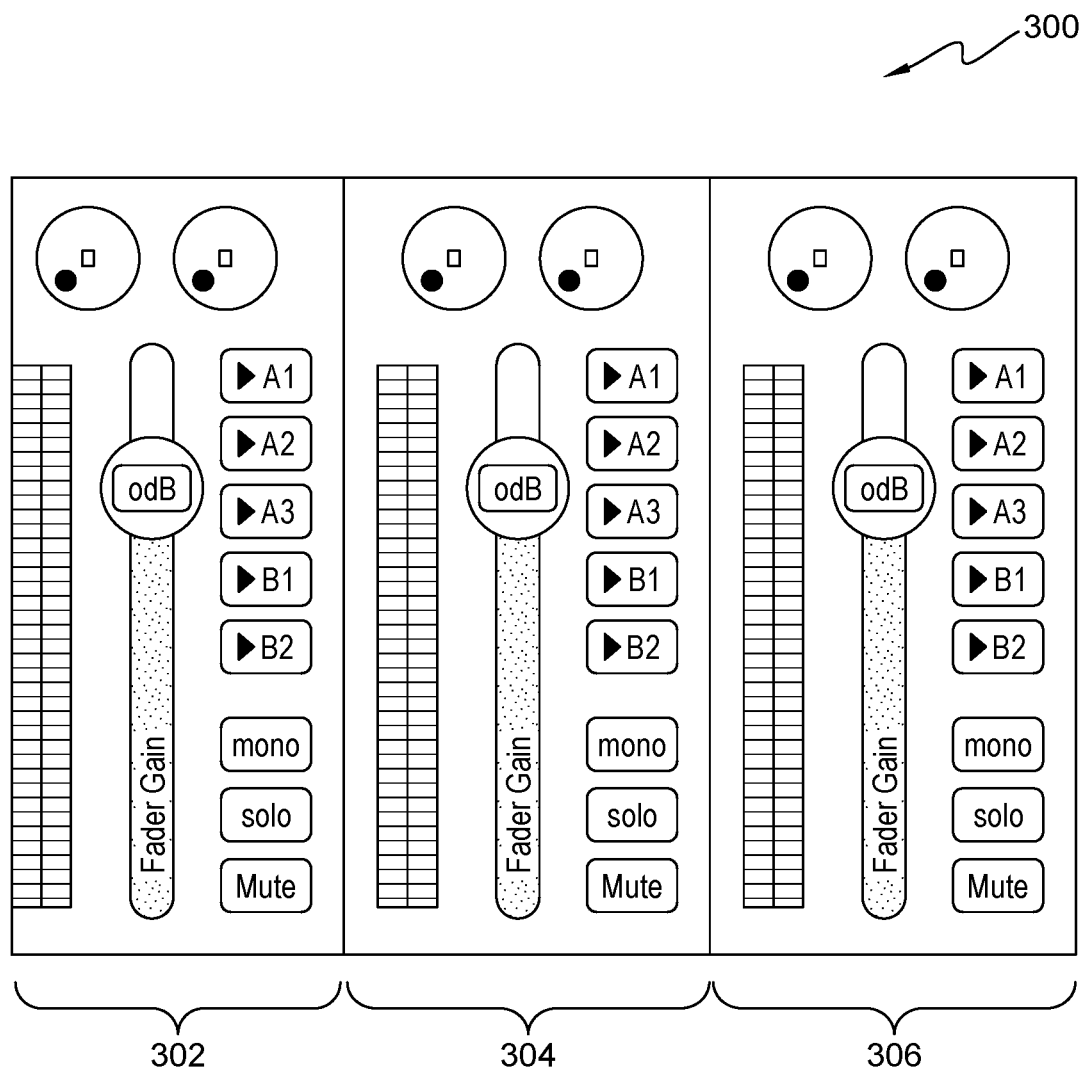
FIGS. 3A, 3B, and 3C depict example user interfaces, in accordance with an embodiment of the present invention.

FIG. 3A depicts an example user interface in accordance with an embodiment of the present invention.

Specifically, FIG. 3A depicts example user interface 300. Example user interface 300 depicts certain controls of a sound mixer. In this example, there are three controls, control 302, 304, and 306 respectively. Each of controls 302, 304, and 306 have respective graphic icons that are selectable via tactile input and are labeled A1, A2, A3, B1, B2, mono, solo, and mute. Other graphic icons in this example also include a fader gain that can similarly be controlled by tactile input via a drag and drop input method.

Figure 3B:
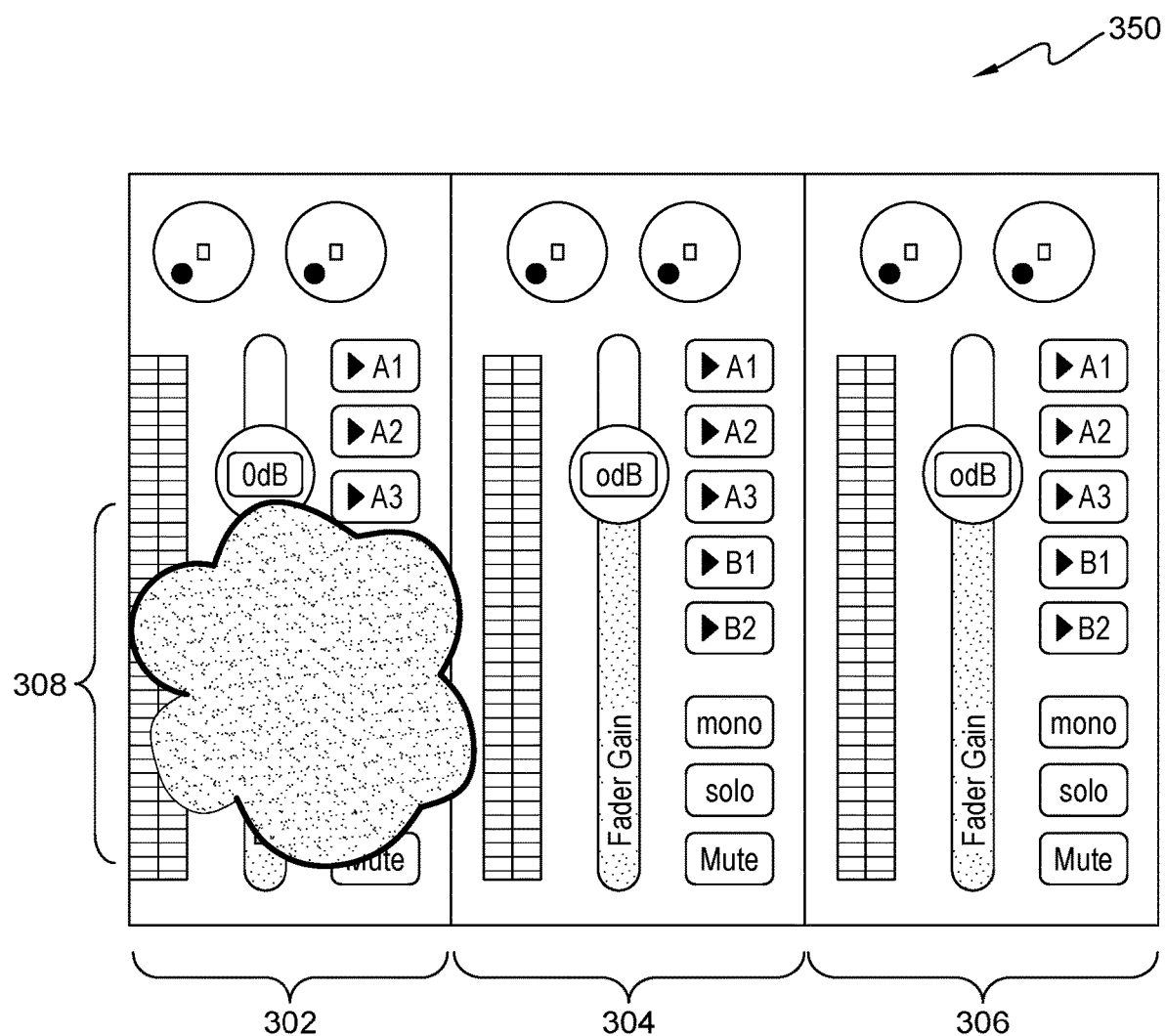

FIG. 3B depicts an example heat map generated in accordance with an embodiment of the present invention.

FIG. 3B depicts example user interface 350. Example user interface 350 is representative of example user interface 300 but with an overlaid heat map that was generated by user interaction interface generator 110. Example user interface 350 also depicts the same controls of a sound mixer (e.g., control 302, 304, and 306). In this example, user interaction interface generator has recorded multiple user attempts and cancellation in an area of the display screen associated with control 302. In response to receiving a request, user interaction interface generator 110 can generate a heat map of the received user inputs. In this example, user interaction interface generator 110 has generated graphic 308 that is then subsequently overlaid over example user interface 350 to show the area of the display screen associated with multiple received input commands that were subsequently cancelled. In this manner, user interaction interface generator 110 can then pull up the map associated with respective controls the area provided. In this example, user interaction interface generator 110 can use the generated heat map graphic to identify input commands mono, solo, mute, and B2 were the input commands associated with the area having multiple failed attempts.

Figure 3C:
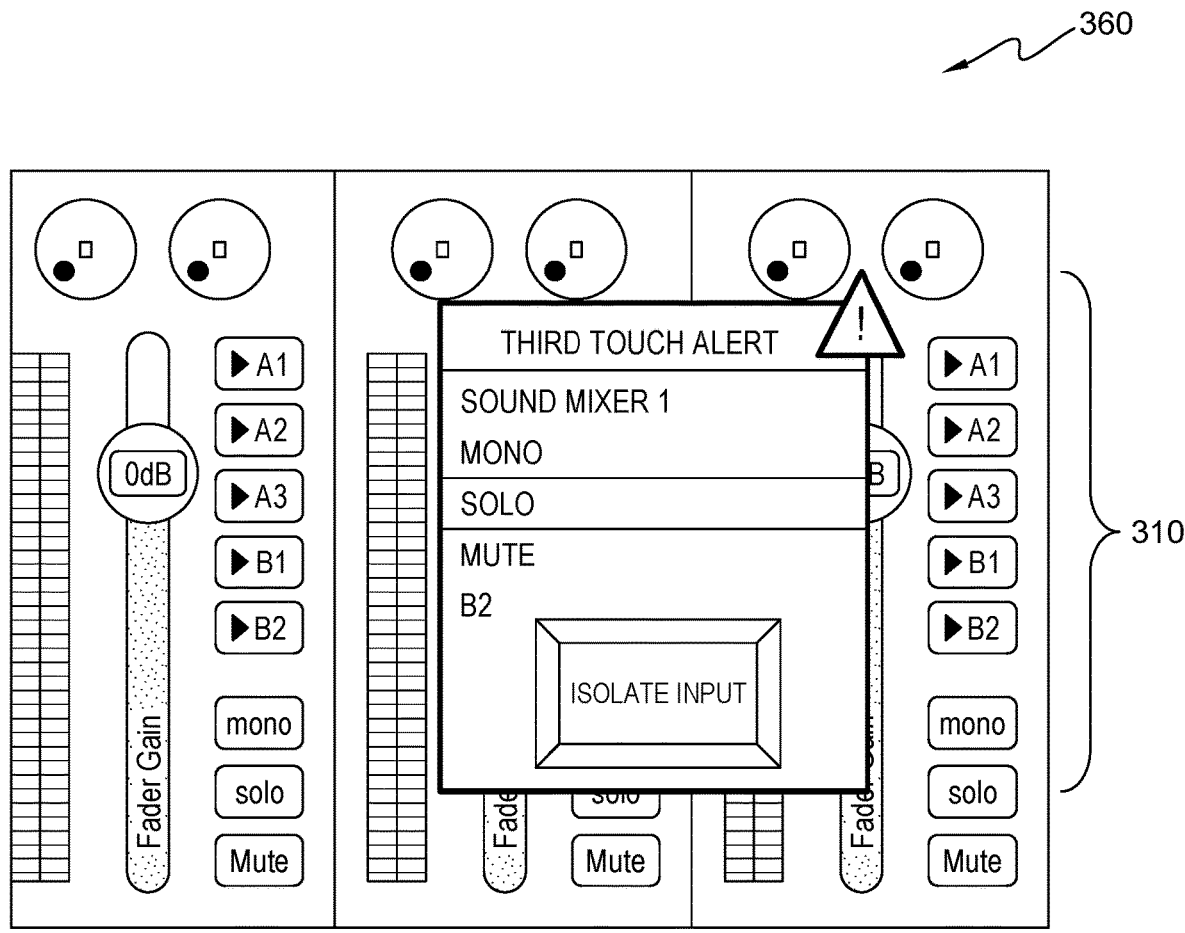

FIG. 3C depict example of a dynamically generated user interface, in accordance with an embodiment of the present invention.

FIG. 3C depicts example user interface 360. Example user interface 360 is representative of example user interface 300 and 350 in that it depicts the same controls control 302, 304, and 306, However, in this example, user interaction generator 110 has identified (e.g., using the generated heat map graphic) input commands mono, solo, mute, and B2 were the input commands associated with the area having multiple failed attempts. In this example, user interaction generator 110 displays an alternate user interface 310. This user interface (e.g., alternate user interface 310) depicts the input commands mono, solo, mute, and B2 in a drop-down menu in a manner different than any of the previous example user interfaces 300, 350, or 360 and is overlaid over example user interface 360. In this example, the drop-down menu presents a "Third Touch Alert" (e.g., representing the threshold number of failed attempts being reached) user interface that is overlaid over the original interface (e.g., user interface 360). This graphic presents graphic options associated with input commands that have been with the multiple failed attempts (e.g., associated with the heat map, graphic 308 of FIG. 3B). No other input command from example user interface 360 can be selected without closing alternate user interface 310. In this embodiment, alternate user interface 310 can be closed by an exit function or by selecting and subsequently executing a command displayed in alternate user interface 310. In response to receiving user input (e.g., selection from one of the input commands), user interaction interface generator 110 can execute program instructions associated with the corresponding user input. For example, in response to receiving user input such as "isolate input", user interaction interface generator 110 can execute program instructions to isolate input.

Figure 4:
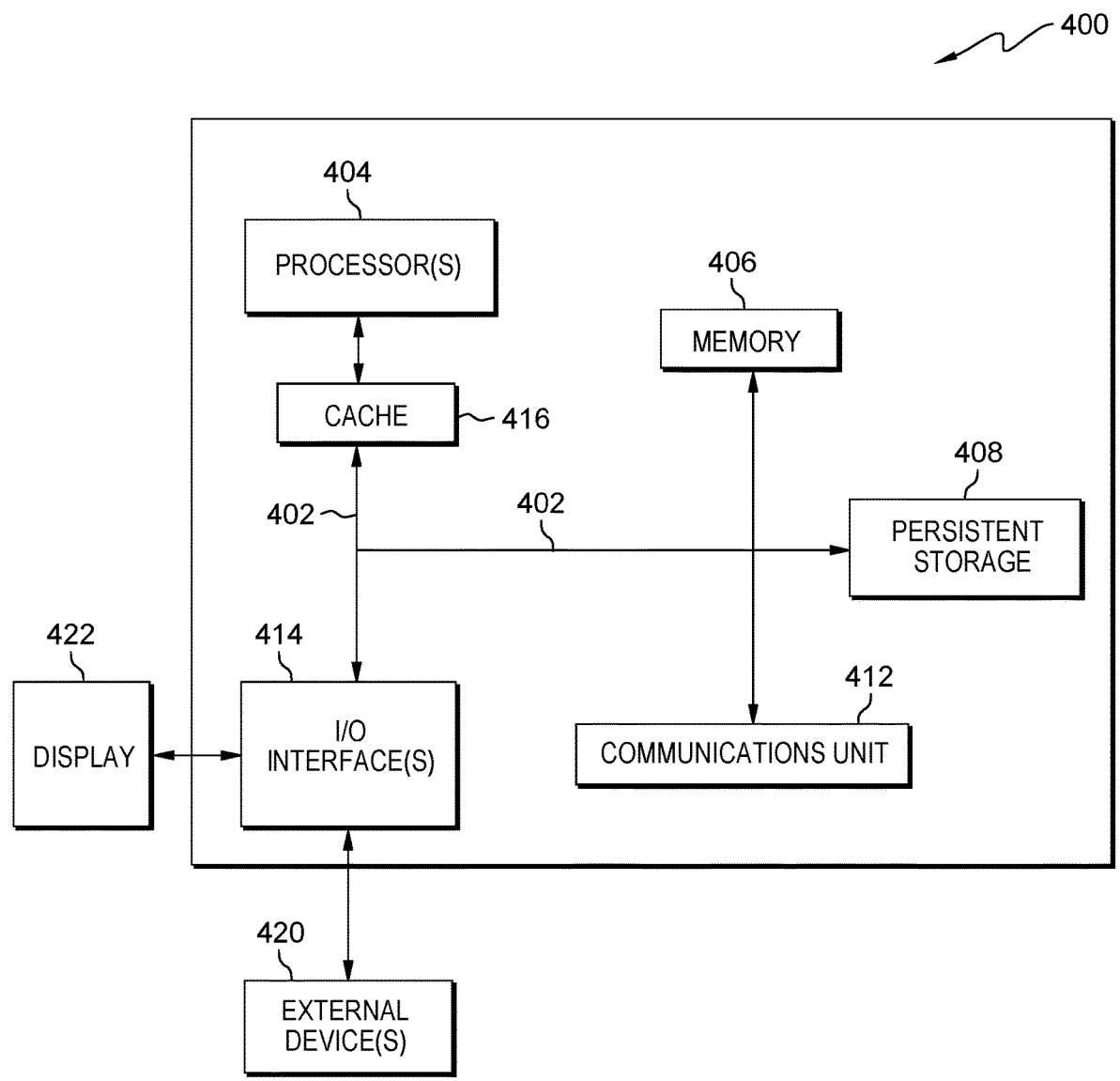
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

User interaction interface generator 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. User interaction interface generator 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., user interaction interface generator 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    capturing one or more interactions with an existing user interface displayed within a display screen;
    in response to reaching a threshold level of failed interactions with the existing user interface and user behavior exhibited after reaching the threshold level of failed interactions, dynamically generating an alternate user interface comprising one or more alternate interaction methods that replace selectable user functions associated with each of the failed interactions that is currently displayed on the existing user interface; and
    overlaying the alternate user interface over the existing user interface.

2. The computer-implemented method of claim 1, further comprising:
    in response to receiving an input from the alternate user interface, executing program instructions associated with the input.

3. The computer-implemented method of claim 1, further comprising:
    in response to detecting frustration of a user, detecting whether behavior of the user is abnormal; and
    in response to detecting abnormal behavior of the user, dynamically generating an alternate user interface comprising one or more alternate interaction methods.

4. The computer-implemented method of claim 1, further comprising:
    storing a map of received user interactions; and
    generating a heat map graphic to be displayed on the display screen that shows a cluster of user interactions.

5. The computer-implemented method of claim 1, further comprising:
    initiating a feedback loop that captures user sentiments to the alternate user interface.

6. The computer-implemented method of claim 1, further comprising:
    utilizing a weighting system to weight one or more elements that correspond to a respective function that are depicted on the existing user interface; and
    dynamically generating an alternate user interface that orders the one or more elements based on the weighting system.

7. The computer-implemented method of claim 1, further comprising:
    capturing discrepancies between a user's intention and tactile inputs.

8. A computer program product comprising:
    one or more computer readable storage media and program instructions stored on the one or more computer readable storage media, the program instructions comprising:
        program instructions to capture one or more interactions with an existing user interface displayed within a display screen;
        program instructions to, in response to reaching a threshold level of failed interactions with the existing user interface and user behavior exhibited after reaching the threshold level of failed interactions, dynamically generate an alternate user interface comprising one or more alternate interaction methods that replace selectable user functions associated with each of the failed interactions that is currently displayed on the existing user interface; and program instructions to overlay the alternate user interface over the existing user interface.

9. The computer program product of claim 8, wherein the program instructions stored on the one or more computer readable storage media further comprise:

program instructions to, in response to receiving an input from the alternate user interface, execute program instructions associated with the input.

10. The computer program product of claim 8, wherein the program instructions stored on the one or more computer readable storage media further comprise:

program instructions to, in response to detecting frustration of a user, detect whether behavior of the user is abnormal; and program instructions to in response to detecting abnormal behavior of the user, dynamically generate an alternate user interface comprising one or more alternate interaction methods.

11. The computer program product of claim 8, wherein the program instructions stored on the one or more computer readable storage media further comprise:

program instructions to store a map of received user interactions; and program instructions to generate a heat map graphic to be displayed on the display screen that shows a cluster of user interactions.

12. The computer program product of claim 8, wherein the program instructions stored on the one or more computer readable storage media further comprise:

program instructions to initiate a feedback loop that captures user sentiments to the alternate user interface.

13. The computer program product of claim 8, wherein the program instructions stored on the one or more computer readable storage media further comprise:

program instructions to utilize a weighting system to weight one or more elements that correspond to a respective function that are depicted on the existing user interface; and program instructions to dynamically generate an alternate user interface that orders the one or more elements based on the weighting system.

14. The computer program product of claim 8, wherein the program instructions stored on the one or more computer readable storage media further comprise:

program instructions to capture discrepancies between a user's intention and tactile inputs.

15. A computer system comprising:

one or more computer processors;

one or more computer readable storage media; and program instructions stored on the one or more computer readable storage media for execution by at least one of the one or more computer processors, the program instructions comprising:

program instructions to capture one or more interactions with an existing user interface displayed within a display screen;

program instructions to, in response to reaching a threshold level of failed interactions with the existing user interface and user behavior exhibited after reaching the threshold level of failed interactions, dynamically generate an alternate user interface comprising one or more alternate interaction methods that replace selectable user functions associated with each of the failed interactions that is currently displayed on the existing user interface; and program instructions to overlay the alternate user interface over the existing user interface.

16. The computer system of claim 15, wherein the program instructions stored on the one or more computer readable storage media further comprise:

program instructions to, in response to receiving an input from the alternate user interface, execute program instructions associated with the input.

17. The computer system of claim 15, wherein the program instructions stored on the one or more computer readable storage media further comprise:

program instructions to, in response to detecting frustration of a user, detect whether behavior of the user is abnormal; and program instructions to in response to detecting abnormal behavior of the user, dynamically generate an alternate user interface comprising one or more alternate interaction methods.

18. The computer system of claim 15, wherein the program instructions stored on the one or more computer readable storage media further comprise:

program instructions to store a map of received user interactions; and program instructions to generate a heat map graphic to be displayed on the display screen that shows a cluster of user interactions.

19. The computer system of claim 15, wherein the program instructions stored on the one or more computer readable storage media further comprise:

program instructions to initiate a feedback loop that captures user sentiments to the alternate user interface.

20. The computer system of claim 15, wherein the program instructions stored on the one or more computer readable storage media further comprise:

program instructions to utilize a weighting system to weight one or more elements that correspond to a respective function that are depicted on the existing user interface; and program instructions to dynamically generate an alternate user interface that orders the one or more elements based on the weighting system.

* * * * *